INVENTOR:
FRANK KALWAITES
BY
ATTORNEYS.

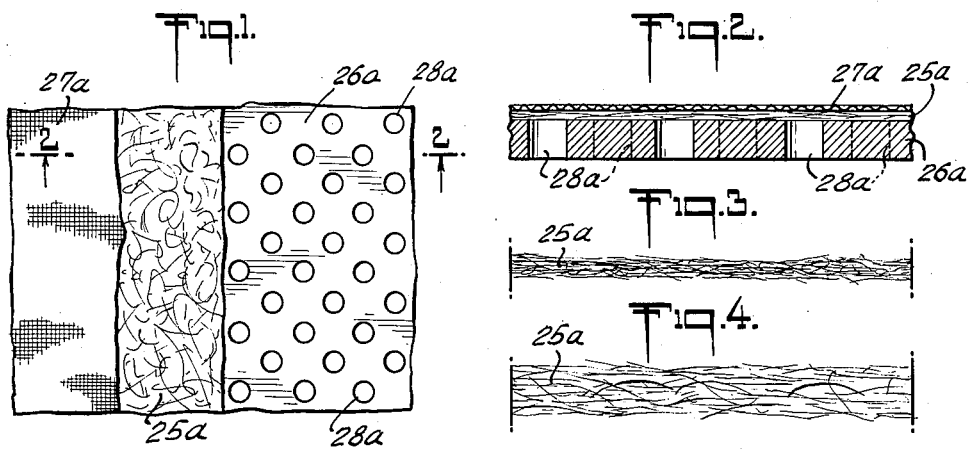
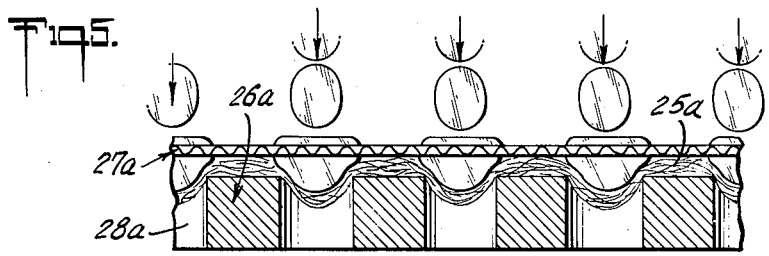
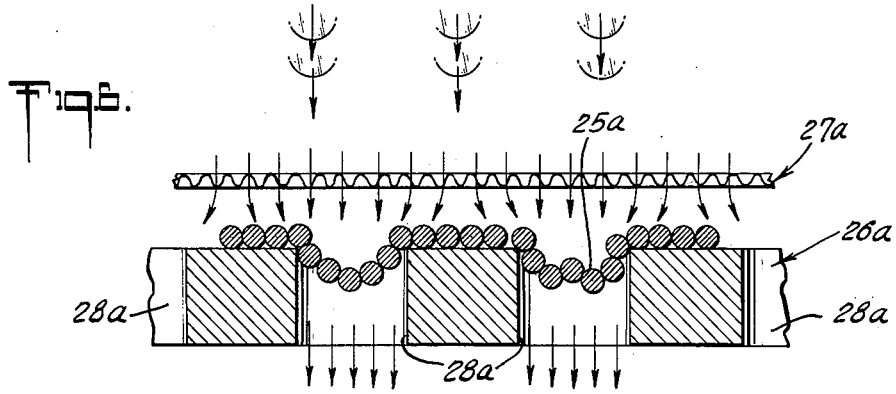
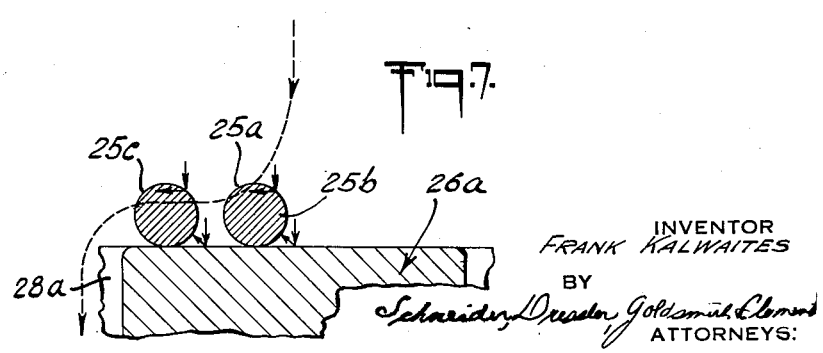

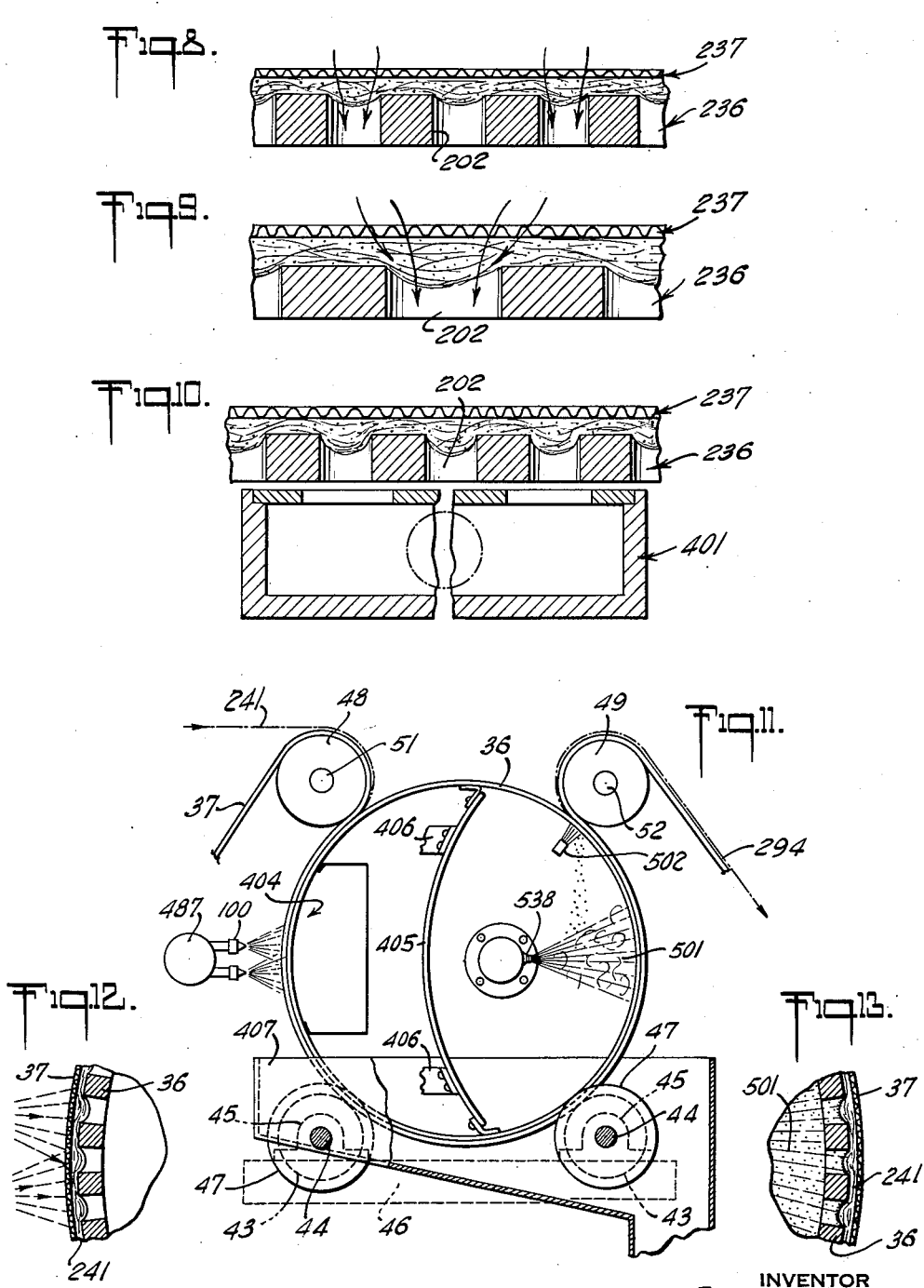

INVENTOR:
FRANK KALWAITES

INVENTOR:
FRANK KALWAITES
BY
Schneider, Dressler, Goldsmith + Clement
ATTORNEYS 3,033,721
Patented May 8, 1962

3,033,721
METHOD AND MACHINE FOR PRODUCING NON-WOVEN FABRIC AND RESULTING PRODUCT
Frank Kalwaites, Somerville, N.J., assignor to Chicopee Manufacturing Corporation, a corporation of Massachusetts
Original application Feb. 23, 1956, Ser. No. 567,275, now Patent No. 2,862,251, dated Dec. 2, 1958. Divided and this application Aug. 14, 1958, Ser. No. 755,023
7 Claims. (Cl. 154—46)

The present invention relates to new methods and apparatus for producing foraminous fabrics, more particularly to methods and apparatus for producing such fabrics from a layer of fibrous material such as a fibrous web wherein the individual fiber elements are capable of movement under the influence of an applied fluid force, and to the resulting novel products.

This application is a division of my copending application, Serial No. 567,275, filed February 23, 1956 now Patent No. 2,862,251, granted December 2, 1958, which in turn is a continuation-in-part of my copending application, Serial No. 500,735, filed April 12, 1955 now abandoned.

According to the invention the application of fluid forces rearranges a layer of fibrous material such as a web of fibers, for example, rayon, cotton, etc., into a foraminous unitary nonwoven three-dimensional fabric structure comprising spaced interconnected packed fibrous portions of the starting material, defining openings arranged in a predetermined pattern, and wherein the packed fibrous portions are interconnected by groups of consolidated fibers in the form of buds or tufts protruding to a certain extent out of the normal plane of the fabric. These buds or tufts are concave as viewed on one side and convex as viewed on the opposite side.

A layer of starting material having individual fibrous elements which are capable of movement under the influence of an applied fluid force is positioned in a rearranging zone, located between means defining spaced apertures arranged in a pattern and means defining foramina smaller than said apertures, wherein the individual fibrous elements are free to move under the influence of the applied fluid forces. The starting fibrous layer is confined in the zone between said apertured and foraminous means, but the individual fibrous elements of the starting fibrous material are in a condition in which they are free to move under the influence of an applied fluid force.

The layer of starting material in the form of a web of fibers is then subjected to streams of a fluid, preferably a liquid such as water, applied over an area of said web. The apertured means and foraminous means are spaced somewhat one from the other during the application of the fluid forces and thereby individual fibrous elements of the web are free to move under the influence of the applied fluid forces. The fluid streams are directed into the rearranging zone first through the foraminous means into the underlying web and then through the apertured means which underlies the web, the foramina in the foraminous means being smaller than the apertures in the apertured means.

With a liquid, preferably water, as the fluid, the fibers within the fibrous layer are lubricated. In the case of water absorbent fibers such as rayon, cotton, etc., the water tends to plasticize the same and make them more workable. Thus, from either or both of these factors, the fiber to fiber friction is reduced, the fiber to apertured and foraminous means friction is reduced, and the fibers are permitted to move even more readily into the desired positions. Water also has a compacting action on rearranged bundles of fibers during drying.

The amount of water is preferably such that the fibers can be more or less readily moved by the forces applied in and through the liquid in said rearranging zone to overcome the frictional or cohesive tendency of the fibers to adhere to each other and to the means defining said zone, and thereby place the fibers in the desired position and in a relaxed condition, to produce the nonwoven fabric.

A solid stream of a fluid, water for example, may be used to rearrange the fiber elements in the layer or an intermittently applied stream, such as a stream of discrete particles may be used.

Care is taken that the amount of water and the depth of the rearranging zone each be less than would tend to flood the zone and thereby displace the rearranged fibers from the desired pattern regions which they are to occupy or have already occupied. In general, "flooding" results in a loss of web identity. By flooding we mean a condition wherein the forces exerted by the motion of the water upon the fibers in their rearranged state exceed the forces upon these fibers arising from fiber-to-fiber friction; fiber-to-apertured means and foraminous means friction; and other restraining forces that may be present. Accordingly, the spacing between the apertured means and the foraminous means defining the rearranging zone and the amount of water employed are such as to provide a rearranged unitary nonwoven fabric. The optimum spacing and the quantity of water employed—depending upon the physical characteristics of the particular fiber used (such as fiber weight, denier, fiber length, frictional characteristics, etc.) the size and spacing of the apertures and foramina, the speed at which fiber rearrangement is to take place, etc.—lie below the flooding condition which would cause loss of web identity and above the minimum condition, depending upon the same factors, for a desirable rate of fiber rearrangement. These conditions are set out in additional detail in a later part of the description.

Flooding may be prevented to a great extent and a more positive movement of the fibers toward the apertures in the apertured means produced by the use of a vacuum assist, i.e., vacuum devices located outside the rearranging zone and adjacent the apertured member by which suction is applied to create a more streamlined flow of fluid through the zone and toward the apertures.

In general, it is preferred that the dimension of the openings in the foraminous backing means be substantially less than the dimension of the apertures in the apertured rearranging means. For example, with an apertured means having uniform apertures in the order of about $\frac{1}{32}$ of an inch in diameter, good results may be obtained where openings in the foraminous means (screen) vary from about 900 openings per square inch to about 50,000 openings per square inch or more preferably from about 10,000 openings to 40,000 openings per square inch. The smoothness or evenness of the foraminous means affects the production of the rearranged fabric or other desired material in accordance with the invention. When woven screening is employed, the evenness or smoothness of the screen is in part a function of its mesh. Thus, a finer screen will tend to be more even and thereby more readily allow the motion of fibers along its surface. A coarse screen may trap fibers and cause them to stick in the screen and retard their movement with respect to the apertured means.

The foraminous means may be made of any suitable material. A screen belt in woven form gives excellent results. However, a woven belt is not essential since the belt may have the openings punched or etched in the material. The belt, in screen form, may be made of stainless steel, bronze, copper, alloy, nylon, synthetic resinous fibrous materials such as fibers sold by the E. I.

du Pont Co., under the trademark "Orlon," or the like. It can be in the form of a flexible punched plate of steel, plastic or other material which is sufficiently foraminous to allow passage of the fluid at the appropriate rate.

The forces exerted by the fluid streams in the rearranging zone move the fibers in a direction generally parallel to the apertured means and into the apertures so that there is produced a packing of buds or tufts in the apertures which are outside of the plane of the layer of starting material and which are interconnected by bands of fibers on the lands between the apertures. Thus, three-dimensional fabrics of a great variety of patterned arrangements may be provided in which packed, tufted, budded, or otherwise consolidated fibers out of the plane of the interconnected groups of fibers are joined by said interconnecting fibers in bands to provide highly desirable properties in the finished fabric.

In general, the starting layer may comprise any material, the individual fibrous elements of which are capable of movement under the influence of an applied fluid force. Although fibrous materials are preferred, non-fibrous particulate materials and plastic masses such as resin particles and similar suitable materials may be employed, so long as they are of appropriate dimensions and made up of discrete separable particles capable of undergoing movement under the influence of applied fluid forces to produce the unitary nonwoven fabric. Accordingly, it is seen that the term "nonwoven fabric" refers to a resulting fabric which is produced directly from the fibers or resin particles or similar elements without the use of conventional spinning, weaving, felting, or knitting operations.

The finished fabric is the result of the rearrangement of the individual fibers subjected to components of fluid forces in a direction generally parallel to the surface of and through the apertured rearranging member.

The individual fibers lie in their rearranged positions in the rearranged fabric in a relaxed condition. There is no substantial tendency for any fiber to return to its original position in the fibrous starting layer because each fiber has been individually moved by fluid forces into a position where strong currents flowing into the passages through the apertured member cause the fiber to be bridged across the intervening land areas between adjacent tufts or buds.

The packing of fibers by fluid forces may be efficiently applied to very thin webs or quite thick webs in accordance with the invention.

For producing a fabric having the characteristic hand and drape of a textile fabric, the layer of starting material or base web may comprise natural fibers, such as cotton, flax, wood, silk, wool, jute, asbestos, ramie, "rag," or abaca; mineral fibers such as glass; artificial fibers such as viscose rayon, cupra-ammonium rayon, ethyl cellulose or cellulose acetate; synthetic fibers such as polyamides, i.e., nylon, polyesters, i.e., "Dacron," acrylics, i.e., "Orlon," "Acrilan" and "Dynel," polyethylene, vinylidene chloride, i.e., saran, polyvinyl chloride, polyurethane, etc., alone or in combination with one another. Viscose rayon has been found to give excellent results in making the fabric of this invention. While relatively long textile-type fibers above normal papermaking lengths and close to normal textile length, say of about ¼ inch to 2 inches or longer, are preferred for textile applications, shorter fibers, below ¼ inch in length and within the papermaking range, may be used for these and other applications. It is preferred, however, that the shorter papermaking fibers be unbeaten or substantially unhydrated if a textile-like fabric is desired as the end product. In this connection, shorter hydrated fibers of woodpulp in a papermaking length, for instance, may be mixed with longer fibers in such a way that the longer fibers will contribute the strength desired in the resulting fabric while the shorter wood fibers will decrease its cost. Good results can also be obained with a layer of hydrated woodpulp fibers which would introduce elements of a plastic mass into the fibrous sheet. Mixtures of fibrous materials, natural and/or synthetic, alone or in combination with resinous and similar plastic particulate materials, arranged in the layer at random (helter-skelter) or in more or less oriented form, such as carded web form, can be rearranged in accordance with the present invention.

Satisfactory rearranged webs may be produced according to this invention from fibrous starting webs weighing between about 80 grains/sq. yd., or slightly lower and about 1200 grains/sq. yd., or even higher.

For commercial use, the preferred apparatus embodiments of the invention are constructed to provide continuous, efficient, relatively high-speed, fiber rearrangement by the application of fluid forces to the layer of fibrous starting material positioned or "sandwiched" in a zone between means presenting spaced apertures defining a pattern and which serves as a support or backing member for the starting material and foraminated means presenting foramina smaller than said apertures and through which the fluid first passes on its way into the fiber rearranging zone. The preferred apparatus embodiments of the invention further include means for applying a strengtheining binder to the fabric confined to the location of its tufts or buds, the binder being applied in the form of a thermoplastic powder for later activation or in the form of a liquid as by a kissing technique.

Advantages of the invention other than those generally described above will be apparent from the following description and claims taken together with the drawings, wherein:

FIG. 1 is a fragmentary partially cut away schematic plan view of the apertured fabric rearranging and supporting member and the foraminous means portion of apparatus according to this invention, with the fibrous web to be converted into a rearranged fabric interposed therebetween to form the aforesaid sandwich.

FIG. 2 is an enlarged fragmentary sectional view taken along the line 2—2 of FIG. 1.

FIG. 3 is a schematic edge view of the fibrous web showing its relative thickness when wet.

FIG. 4 is a schematic edge view of the fibrous web showing its relative thickness when dry.

FIG. 5 is a schematic sectional view of the fabric rearranging zone and showing the apertured plate and screen positioned to produce three-dimensional fabrics.

FIG. 6 is an enlarged view of a section taken at right angles to the view shown in FIG. 5 and illustrating the packing component of force acting to produce a three-dimensional fabric.

FIG. 7 is a schematic view illustrating the components of force exerted by the liquid particles on the fibrous web to produce the fabric shown in FIG. 6.

FIG. 8 is an enlarged fragmentary view in vertical section taken through a fiber rearranging zone suitable for producing a three-dimensional fabric and showing the process in the early stages of fiber rearrangement.

FIG. 9 is a fragmentary portion of FIG. 8 on an enlarged scale.

FIG. 10 is an enlarged fragmentary view in section as in FIG. 8 but at a later stage in the production of a three-dimensional fabric and with vacuum assist.

FIG. 11 is a diagrammatic elevational view of preferred apparatus for producing the rearranged fabric in accordance with the invention.

FIG. 12 is a fragmentary detail in section of the portion of the drum, belt, and web in FIG. 11 where fabric rearrangement takes place.

FIG. 13 is a fragmentary detail in section of the portion of the drum, web, and belt as in FIG. 11 where the bonding adhesive is applied.

Figure 14:
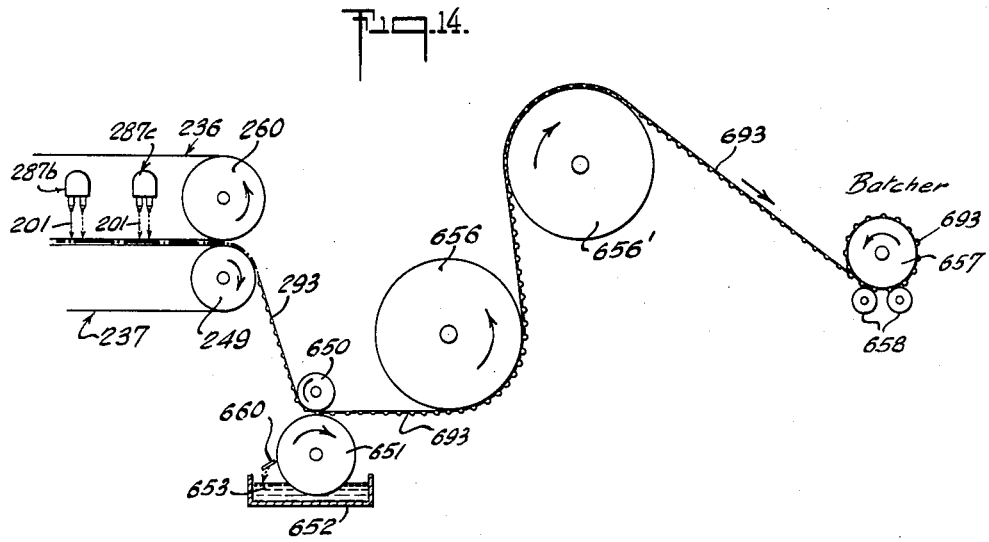
FIG. 14 is a diagrammatic view of apparatus for applying adhesive to the protuberances of a three-dimensional fabric by a "kissing" technique.

Referring to FIGS. 1 and 2 of the drawings, by way of illustration, there is shown a web or layer 25a of mechanically engaged fibers, in a state of balanced equilibrium, such as may be formed by carding, garnetting, air-laying, by techniques such as disclosed in United States Patent 2,676,364, papermaking techniques, etc., sandwiched between an apertured rearranging and supporting plate 26a and foraminous means 27a such as a fine mesh screen. The plate may comprise apertures or holes 28a arranged in a definite pattern. The size of these apertures is substantially larger than the openings in the foraminous means, screen belt 27a.

As shown by the schematic edge views of the fibrous web when dry and when wet with a liquid in FIGS. 4 and 3, respectively, the starting layer 25a upon being wet with water is reduced in thickness. The general surface tension of the water in the web draws the fiber closer together. The fibers themselves may swell to a degree, depending on their attraction for water. Rayon fibers, for example, will swell markedly, whereas nylon fibers will not. The degree of fiber swelling, however, is of relatively minor importance. Of greater importance is the effect of the water upon the crimp or spatial configuration of the fibers. Fibers that are water sensitive, such as rayon, will tend to become much limper when wet and lose any crimp that they possess in the dry state. Water insensitive fibers, on the other hand, such as nylon, will tend to retain their crimp and resist compacting when the web is wet.

When the plate 26a and screen belt 27a are as shown in FIGS. 1, 2, 5 and 6, and the applied fluid force is directed against the sandwich from the exposed side of the foraminous member or screen belt 27a, the screen belt acts as a spray diffusing member and an inverted three-dimensional fabric is produced in and between the apertures of plate 26a.

Figure 21:
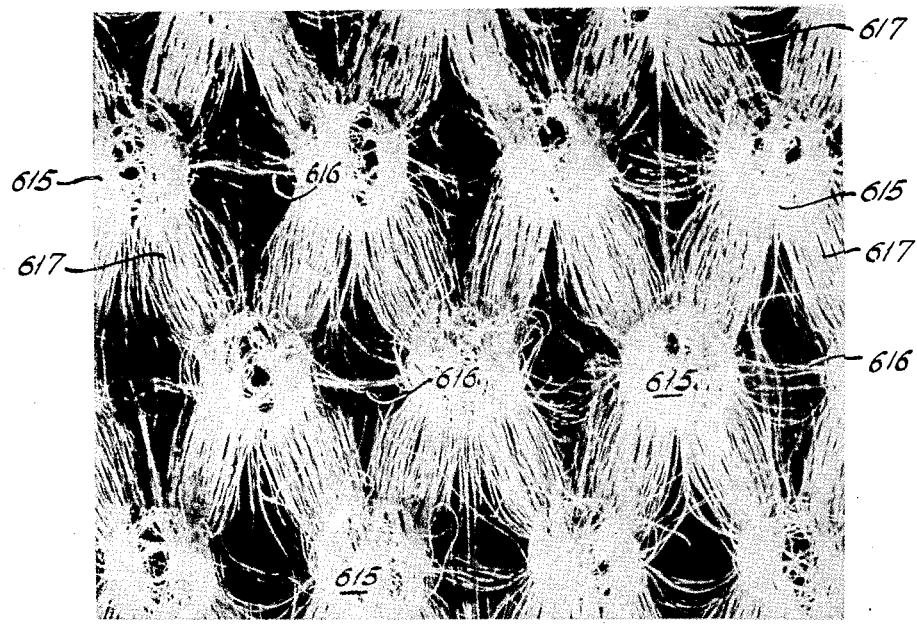
FIG. 21 is a photomicrograph of the fabric illustrated schematically in FIG. 18 but enlarged about 20 times.
Figure 22:
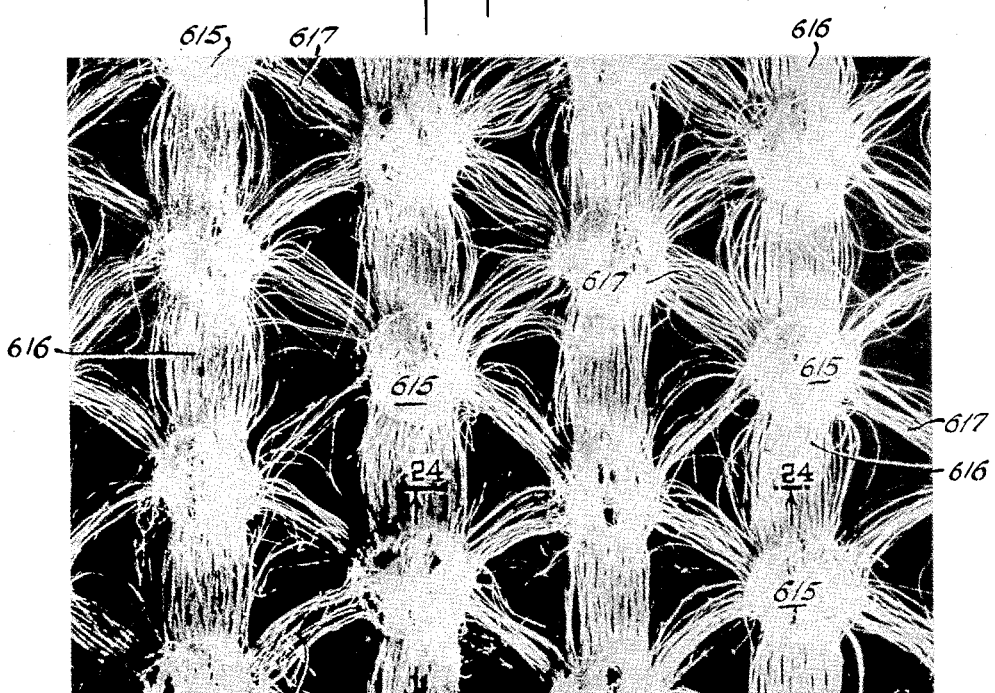
FIG. 22 is a photomicrograph of the fabric illustrated schematically in FIG. 17 but enlarged about 20 times.
Figure 23:
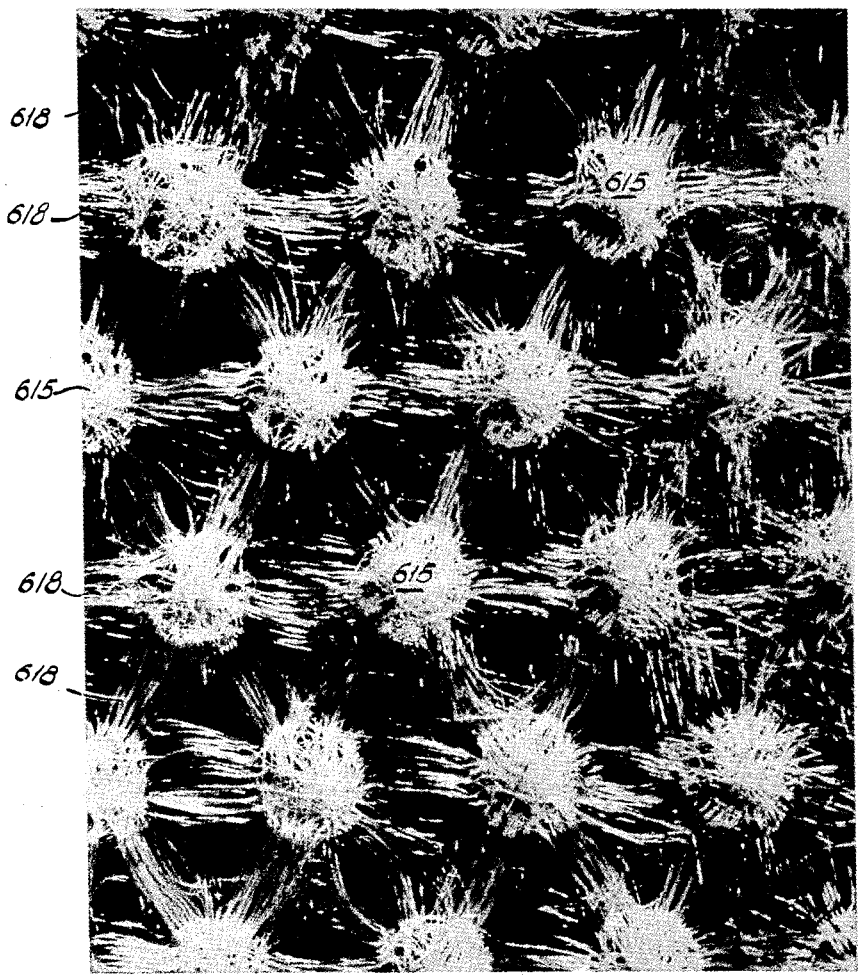
FIG. 23 is a photomicrograph of the fabric illustrated schematically in FIG. 19 but enlarged about 20 times.

To accomplish this, the fluid, preferably water, is projected against the spray diffusing screen member, then passes through the intermediate web to be rearranged and finally passes through the apertured rearranging plate to carry into the apertures of such plate a portion of the fibers of the web. As the fibers are carried into the apertures they tend to intermingle in random arrangement and become interlocked into a three-dimensional tufted or budded structure with individual fibers from this structure extending in various directions into the adjacent fabric structure as shown in FIGS. 21, 22 and 23 for example.

The liquid streams projected through the fibrous web relocate the fibers in the fibrous starting material into new, relatively unstressed positions where they lie in a state of mechanical equilibrium. In the relocated positions, the fibers are mechanically engaged, both frictionally and/or by interlocking of the fibers. Of basic importance in the product produced by the method and apparatus of this invention is the fact that the new arrangement of the fibers is one of balanced equilibrium, the rearranged or relocated fibers having substantially no in-built tendency to revert to their original arrangement. Thus, in this product the fibers are in a new state of balanced equilibrium and exhibit substantially no tendency to spring back to the original balanced state of equilibrium of the fibers in the starting web.

The action of the fluid upon the fibers and the extent to which the fibers are moved is a function of the hydraulic or other fluid forces acting in the plane of the starting material. The distance between the adjacent surfaces of the foraminous means and the apertured rearranging plate, the velocity of the fluid, the weight of the starting web, the nature of the fibers, and other factors, as hereinafter set forth, affect these forces.

In FIGS. 11 to 13 there is shown an illustrative embodiment of preferred drum apparatus according to this invention capable of continuous operation at relatively high speeds. This apparatus comprises a cylindrical apertured drum 36, a foraminous member in the form of a continuous screen belt 37, and spray nozzles 100 outside the drum for projecting streams of liquid such as water through the screen belt 37. A layer 241 of starting material, suitably in the form of a three-ply laminate of webs of carded cotton fibers, for example, may be sandwiched between the cylindrical drum wall 36 and the belt 37 to be rearranged into the fabric of this invention by the liquid being directed through the foraminous member, then through the starting material and then through the drum apertures.

The drum, which may have flanges at each end for reinforcing purposes as described in more detail in my copending application Ser. No. 567,275, now Patent No. 2,862,251, is mounted in the cradle formed by two pairs of spaced flanged wheels 43. Each pair comprises a wheel 43 at each end of the drum fixed to a common shaft 44 which in turn is free to rotate in stationary bearings 45 mounted on a fixed foundation frame 46. The axles or shafts 44 supporting each pair of wheels are spaced to provide stable support for the drum 36. Each wheel includes an external flange 47 extending upwardly from its supporting surface beyond one of the ends of the drum 36 and adjacent thereto, thereby holding the drum in position against lateral movement along its axis.

The screen 37 passes around a major segment of the drum and is held in position thereon by positioning rollers 48 and 49 (FIG. 11) located above the drum and close to its surface. These rollers are fixed to shafts 51 and 52 which are free to rotate in bearings suitably mounted in the fixed framework of the machine. The belt also passes around rotatable guiderollers below the drum to form a continuous belt which is driven at the same linear speed as the surface of the apertured cylindrical drum 36.

Nozzles 100 for projecting streams of liquid droplets toward the outer surface of the foraminous belt member are mounted in banks along the length of a pressure cylinder 487 fixed (not shown) to the framework of the machine.

Fluid under pressure may be applied to the interior of cylinder 487 from any suitable source, likewise not shown. There may be one line or bank of nozzles positioned partly or entirely across the axial length of the drum, but it is preferred that at least two banks of nozzles be employed. Three, four, or even more banks of nozzles may be advantageous under certain conditions since they tend to increase the range of speed of the machine. Conventional forms of nozzles may be employed, solid cone nozzles being preferred. As shown in FIG. 12, the fiber rearrangement in the fabric web 241 sandwiched between the drum 36 and screen 37 occurs at a side of the drum adjacent the entry of web 241 into the nip between first positioning roll 48 and the drum. The preferred positioning of the nozzles is such as provides the desired distinctness, clarity and integrity of the rearranged fibrous web in view of the weight of the starting web, the kind of fibers, the spray conditions, the pattern, etc.

In operation, a layer of starting material 241 such as a web of carded cotton fibers, for example, may be passed over the first positioning roller 48 and into contact with the continuous screen 37. The screen, carrying the web, may be passed around the portion of the drum 36 in the way of liquid being directed at the outside of the belt screen from the nozzles 100. Thence the web passes around the drum over the second positioning roller 49, and thence to a station, not shown, where the finished web is removed from the supporting foraminous screen. As the fibrous web to be rearranged passes the nozzle assembly located outside the foraminous screen it also passes a vacuum box 404 correspondingly located inside the drum 36 and which has an apertured surface located closely adjacent the inner cylindrical surface of the rearranging cylinder and through which suction is caused to act upon the web. Suction thus applied assists in the rearrangement of the fibers as the web material passes through the zone in which it is acted upon by the fluid. It serves also to assist the production of three-dimensional tufts while simultaneously dewatering the product to prevent flooding during fabric rearrangement.

In general, where vacuum is utilized to avoid flooding conditions and to aid fabric rearrangement, the amount of vacuum to be applied to the web is preferably that corresponding to a vacuum equivalent to about ½ inch mercury to about 3 inches mercury. It is, of course, to be understood that the amount of vacuum to be applied to the web to assist in draining water from the web in the production of the three-dimensional budded fabric must be limited to avoid disruptive forces on the fiber within the web and thus destroy the unity of the web. It is important that the unitary construction of the web be maintained concomitant with the rearrangement of the fibers from the original carded form into the rearranged three-dimensional budded arrangement of the present invention.

With the assemblage of FIG. 11 and utilizing a rearranging screen having perforations uniformly spaced 50 openings per square inch, ¹⁄₁₆ inch diameter, the nozzles suitable for use in effecting the production of three-dimensional buds may be of the conventional solid-cone type. With these nozzles and with the rearranging screen of the above construction and the spacing of nozzles as shown and with the aid of vacuum, if the nozzles deliver an amount of water into the rearranging zone varying approximately from .5 gal. per min. to 2 gal. per min. for each nozzle there is no flooding. Proper web rearrangement takes place with this amount of water where the nozzles deliver the aforesaid amount of water at a rate of about 50 ft. per sec. to 200 ft. per sec. at the delivery end of the nozzles, when the delivery end of the nozzles is spaced about four inches from the assemblage.

It is of course understood that the spray control foraminous belt must not be in such close contiguity to the rearranging cylinder as to preclude the movement of fibers under the influence of the water forces into the three-dimensional budded structure. In general, it is preferred that there be the minimum spatial relationship between the two members which would permit sidewise movement of the fibers into the three-dimensional budded structure and yet at the same time to avoid displacement of fibers from the plane of the web as a result of upward components of forces resulting from the impact of the liquid on the imperforate portions of the apertured supporting surface.

A better understanding of three-dimensional fabric production with vacuum assist may be had by reference to FIGS. 8 to 10. In these figures there are shown diagrammatically different stages of three-dimensional fabric production which may be obtained with the use of the apparatus of FIG. 11. By the action of the intermittent bombardment of the fluid particles, fibers bridge the larger apertures 202 of the apertured rearranging cylinder 236. The smaller foramina in the foraminated belt 237 serve as spray diffusing means to break the fluid stream or particles into even smaller particles. Sidewise components of force are exerted to push some of the fibers into areas immediately adjacent the apertures and between immediately neighboring apertures while other portions of the fibers are pushed into the aperture 202 in a downwardly tufted pattern.

This rearrangement of fibers and its manner of doing is illustrated in FIG. 5 wherein it is seen that the web 25a assumes a "sinusoidal" shape in cross section, having areas in cross section showing a packed appearance above the land areas of the apertured rearranging means 26a and also having the tufted portions representing a greater concentration of fibers which protrude downwardly between the side walls of apertures 28a.

It is important that fiber movement be permitted to occur easily on the inner surface of the apertured rearranging means 26a. For this reason its surface should be smooth and have no sharp corners to interfere with movement of the fibers into the desired position.

Assisting the production of the three-dimensional fabric is the use of the vacuum assist 401 as shown in FIG. 10, whose action is identical with that of the vacuum assist box 404 in FIG. 11. Here, the droplets of water as indicated in FIG. 5 are quickly moved out of the tufted areas in the apertures of the rearranging member 236 and removed through the vacuum assist 401. Better packing of the three-dimensional fabric and improved dryness are attained by the use of such an assist.

Illustrated in FIGS. 6 and 7 are more highly idealized and exaggerated schematic views of the forces which are exerted during the projection of fluid particles through the sandwich. The fluid particles passing the foraminous means 27a move the individual fibers of the web 25a along the land areas of the apertured means 26a and are concentrated in the tufts or bundles which bridge the apertures across adjacent land areas of the apertured means 28a. The forces from the fluid applied through the apertures of the foraminated member 27a are illustrated by arrows passing through the openings in said foraminated member. These forces tend to move the individual fibers sidewise to pack them in the form of tufts across the apertures. In FIG. 6 there are still some fibers left on the land areas of apertured means 26a which have not yet been moved into a tuft, but if rearrangement of the fabric is carried to completion these will be moved laterally in one direction or another to join the tufts at one aperture or another.

As shown in FIG. 7 on a highly schematic basis, an individual droplet represented in terms of its applied force by the arrow, strikes element 26a along a side of the fiber marked 25b to move it into a new location as indicated by fiber 25c. Assisting this sidewise component of force is the reflected force shown by the arrows at the base of fiber section 25b. The force reflecting from the land areas of 26a strikes the bottom profile of the fiber section to move it in the direction which is taken by the fiber section 25c. Such movement may continue until the fiber bridges the aperture. Because of the presence of fibers in appreciable amount which are in random relationship, even in carded webs having a degree of orientation of about 90 percent, there is sufficient intertangling of such fibers so that there is surprisingly little loss of fibers which are washed through the apertures 28a of member 26a under properly controlled spray conditions.

Such loss as may tend to occur may be minimized by controlling the tension between members 237 and 236 shown in FIGS. 8 and 9. Movement into the openings or apertures of the fabric rearranging means 236 is enhanced by providing a larger spacing between the foraminated backing members 237 and 236 as shown in FIG. 9, and such movement is somewhat decreased with the smaller spacing as shown in FIG. 8.

With reference to FIG. 11 and as shown in the insert of FIG. 12, at the fiber rearranging zone immediately adjacent the sprays and opposite the vacuum receiver 404, tufted fabrics are produced from starting web 241. Belt 37 has smaller openings than the apertures in drum 36.

In the machine illustrated in FIG. 11, the tufts or bud portions of the three-dimensional fabrics are sprayed with a powdered adhesive from spray means 538 which applies a fine powder 501 to adhere to the moist bud areas as shown in FIG. 13. A guard 405 mounted on supports 406 secured to the machine frame prevents any of the powder which collects in the drum from falling back into the rearranging zone of the drum and a brush 502 is provided near the exit nip where the rearranged fabric 294 starts over the roll 49 to brush away excess powdered adhesive material from the tufts. A drain pan 407 is provided in order that water deflected by the outside of belt 37 may be carried away from the machine.

The orientation of the fibers in the starting web, 241 or 25a as shown in the various figures of the drawings is of importance with regard to the ease of fabric rearrangement. As illustrated in FIGS. 17, 18, 19, and 20 with respect to the production of three-dimensioned budded fabrics, different kinds of fiber orientation in the starting web with respect to the geometry and orientation of the rearranging apertures in spaced relation may produce different fiber rearrangement in the finished product.

There are several types of webs that can be used satisfactorily in the practice of this invention. A carded web contains a plurality of overlapping, intersecting fibers, generally arranged in the direction in which the web leaves the carding machine. If this web is subjected to a longitudinal stretch, the "degree of orientation" increases, so that the fibers become predominately arranged in this direction.

Another type of web is the "iso" web, wherein the fibers are arranged so that they extend in all directions, substantially in the plane of the web in essentially equal numbers. This type of web can be made by a variety of systems, as for example, an air-laying machine as described in U.S. Patent 2,676,364.

A wet formed web can be made by suspending fibers in a large volume of water and then passing the resulting slurry through a wire screen, as for example, Fourdrinier paper machine wire.

In accordance with the invention it is preferred to use a carded web preferably with the fibers oriented predominately in a single direction or an iso web.

Figure 17:
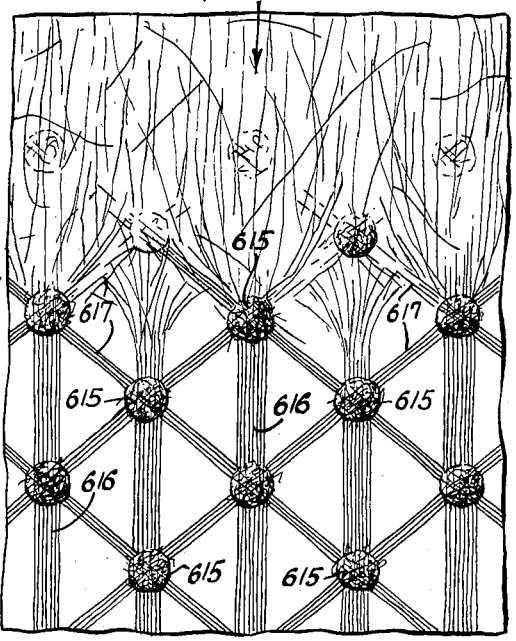
FIG. 17 is a schematic diagram showing production of three-dimensional fabrics using a carded fiber web having the fibers generally oriented in the direction of travel of the web (indicated by the arrow).

FIG. 17 is a diagrammatic showing of a web carded in the direction of the vertical axes passing through successive apertures in the fabric rearranging member just as the web passes through the fiber rearranging zone. The direction of travel of the web is, as indicated by the arrow, from the top of the figure to the bottom, the fibers being shown at the top of the figure before rearrangement takes place, their main orientation also being in the direction of the arrow, and at the bottom after passing through the fabric rearranging zone. In said zone, the fluid forces pass first through the smaller foramina of the foramina defining means and then through the larger apertures in the apertured means to rearrange the fibrous carded web interposed between these means into a tufted three-dimensional fabric having bud portions 615, consolidated flat packed ribbons 616 extending in the direction of general orientation of the web fibers, and smaller consolidated transverse flat bundles 617 which extend between immediately neighboring buds 615 in a direction generally transverse to the direction of main fiber orientation.

In general, the consolidated fibers constituting the vertical bundles 616 or the transverse bundles 617 will tend principally to travel from a given hole in the apertured means to the immediately adjacent hole having the least separation measured in the direction which is transverse to the general orientation of the fibers. Thus, in the web shown in FIG. 17 there is a greater concentration of fibers or a wider band 616 in the vertical direction than in the transverse direction. The photomicrograph in FIG. 22 shows an enlargement of a fabric prepared in this way.

Figure 18:
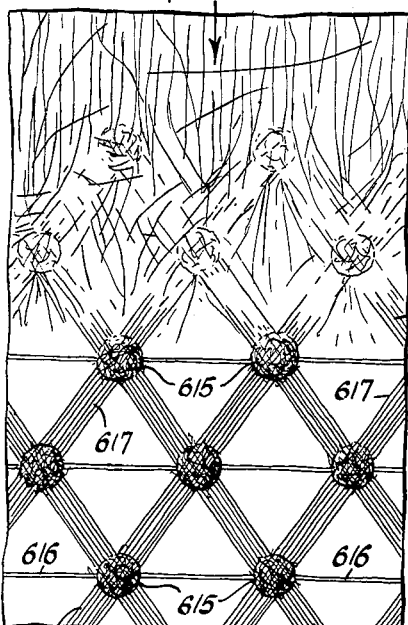
FIG. 18 is a schematic diagram showing production of three-dimensional fabrics using a carded web as in FIG. 17, but with the apertured rearranging means of FIG. 17 rotated 90 degrees.

By rotating the pattern of the apertured means 90 degrees from that shown in FIG. 17, the condition shown diagrammatically in FIG. 18 is achieved. In FIG. 18 the same diamond pattern of the apertured rearranging means as in FIG. 17 is employed but rotated 90 degrees, the orientation of the fibers remaining generally vertical. The ribbons 617 are now thicker in the diagonal directions because the buds 615 lying along axes oriented closest to the orientation of the fibers are closer together than they were in FIG. 17. For the same reason the horizontal bundles 616 are much narrower. A photomicrograph of the fabric thus obtained is presented in FIG. 21.

Figure 19:
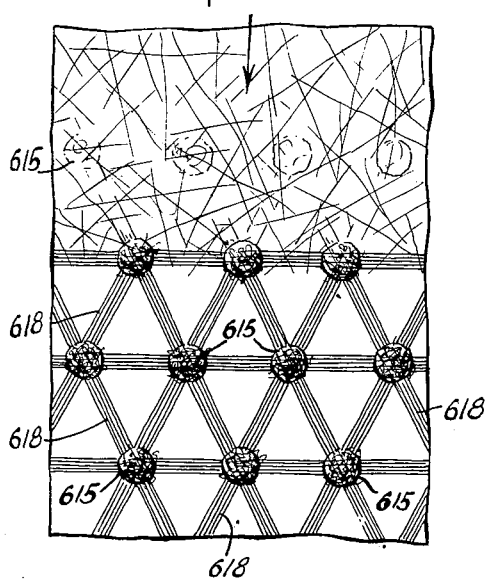
FIG. 19 is a schematic diagram showing production of three-dimensional fabrics using a web with fibers extending randomly in all directions, i.e., an iso web.

The use of an isotropic web as shown in FIG. 19 might be said to introduce an element of parallelism in every direction with respect to the orientation of any individual fiber, and significantly each bud structure 615 shown in this figure is joined by consolidated fibers in groups of substantially the same size extending to each immediately adjacent hole or bud 615 surrounding the bud in question. Referring specifically to FIG. 19, the consolidated fibers 618 radiate like spokes of a wheel to the hexagon defined by the six immediately adjacent three-dimensional bud structures. Each of the sides of the hexagon which join immediately adjacent bud structures is constituted by this same consolidation of fibers.

With regard to the geometry of the packing of the ribbons such as 618 and the production of the budded protuberances 615 in a direction perpendicular to the plane in which the consolidated ribbons of fibers lie, it is noted that the buds constitute pivot points or raised portions which impart surface softness, as well as distribute and strengthen the consolidated ribbons. As a result of the orientation provided, desirable patterned softness and strength characteristics similar to woven textile fabrics of the same weight may be obtained.

For three-dimensional fabrics, it is essential that the surface of the apertured member upon which the web is to be supported and rearranged, be smooth. Three-dimensional buds will be produced in the web with any sized openings and with any arrangement of openings, but voids in addition to three-dimensional buds are produced only where the distance between the openings, the size of the openings and the length of the fibers in the web are such as to enable the fibers to consolidate as bands in zones which extend between adjacent openings.

In the consolidation of fibers in adjacent zones between the three-dimensional budded structures the distribution of holes regularly spaced on the smooth plate with relation to the direction of carding of the web provides alternate geometric possibilities for the joining of adjacent fibers. For example, in a diamond pattern as illustrated in FIG. 21, the heavy consolidated fibers 617 joining adjacent three-dimensional buds 615 might in the general case be either between bud portions at a vertical apex or between bud portions 615 at opposite sides in the transverse line of the diamond. Due to the influence of the substantial parallelism of the fibers in the particular case shown, however, substantially all of the thick consolidated fiber bundles are in the form of the diamond which is in the general direction of parallelizing rather than transverse to this direction across the median line of the diamond. In addition, there is substantially no consolidation of fibers between the upper and lower apices of the diamond pattern shown in FIG. 21, resulting thereby in improved uniformity, definition and clarity of the diamond shape unmarred by diagonals between the upper and lower corners. There is, however, some consolidation between the transverse corners of the diamond.

It is, of course, understood that the above criteria are illustrative of one set of conditions for insuring proper production of three-dimensional buds in accordance with the invention. It is to be understood that these conditions may be varied rather widely, depending upon the weight of the web, the speed of web travel, the number and size and arrangement of openings, the rearranging criteria, nature of fibers, the velocity of the water delivered by the nozzles, the spacing of the nozzles from the web, and other variables which enter into the problems of proper web rearrangement and the matter of the avoidance of flooding at the region of the rearranging belt by insuring proper drainage of the water projected against the web assemblage.

The aforesaid conditions of belt structure and relationship, nozzle construction, water velocity and volume, and grain weight of the web, and other factors affecting three-dimensional bud fabric production, are effective for the rearrangement of a three-dimensional bud fabric from carded fibers in webs made from a mixture of for example approximately 75 percent rayon fiber and 25 percent cotton fiber.

In general, the invention lends itself for the rearrangement of fibers in webs having any orientation and wherein the nature of the fibers may vary widely.

In the foregoing description, the emphasis has been placed on making a fabric from a layer of textile-like fibers. It is to be understood that the invention is not to be limited to the production of fabrics from such layers, since the above-described method is applicable to the production of holes or openings of any desired configuration in any material such as a coherent material which is capable of flow or movement under the influence of an applied fluid force such as the force of flowing water, gas, or other fluid. For example, the invention is applicable to the production of holes of a desired configuration in all-paper pulp material or in a mixture of textile fibers and paper pulp material, alone, or in a mixture with a resin or other plastic material.

Figure 24:
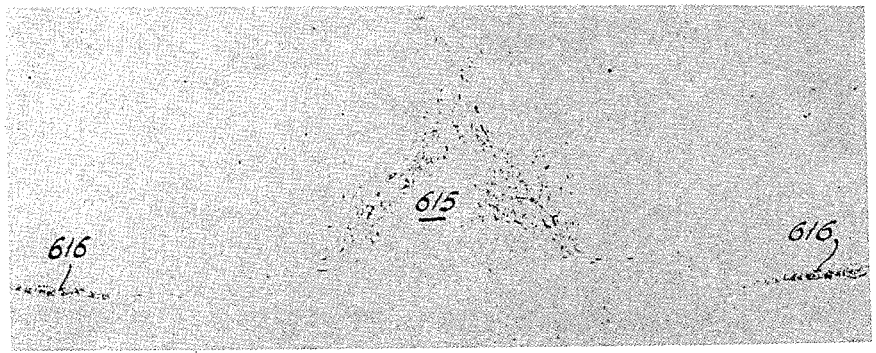
FIG. 24 is a photomicrograph of a cross-section of a tuft taken along the line 24—24 in FIG. 22, but further enlarged about two times.

In the rearrangement of webs to produce the three-dimensional budded fabrics of the invention, the greatest concentration of fibers is found in the bud areas 615 as shown in the photomicrograph, FIG. 24, of a section through a bud portion of the fabric. In the photomicrograph, it is seen that the fibers have been rearranged from a substantially uniform starting density to one in which the interconnecting band areas 616 have a minor concentration of the fibers and the budded portion 615 has a major concentration of the fibers. As clearly indicated in FIGURES 22 and 24, each bud 615 is concave as viewed on one side and convex as viewed on the opposite side.

It is thus seen that the individual fibrous elements of the web being rearranged tend to congregate or concentrate at the bud portions. This is of particular advantage in permitting modification of the bud portions by employing certain desirable additives such as particulate material in the starting web which is to be rearranged. This is caused by three things. First, the tufts constitute heavy fiber concentration points because a plurality of interconnecting bands 616 intersect at these points. Second, the looping of fibers down into the apertures to produce the tufts consumes more fiber length than do the flat interconnecting bonds in which the individual fibers lie substantially straight. Third, the fibers first swept into the apertures to form the tufts are apparently jumbled around additionally by the swirling fluid currents that follow as these currents pass through tufts already partially produced.

As already explained, the tufted portions 615 may be bonded with adhesive applied in the form of particles. They may also be bonded by a liquid, or with a binder in the form of rods or the like as will hereinafter be described.

Figure 25:
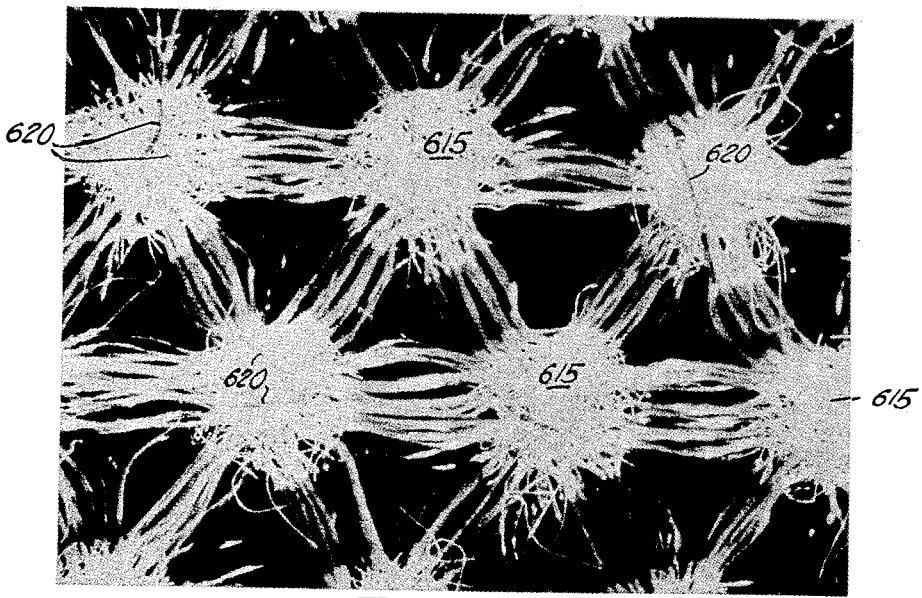
FIG. 25 is a photomicrograph of the fabric illustrated schematically in FIG. 20 but enlarged about 20 times.

As shown in FIG. 25, a small amount of adhesive rods 620 which have been included in the fiber mixture of the starting web have been congregated during web rearrangement at the bud areas 615. In this photomicrograph, the rods are 1/32 inch long, 15 denier nylon. The base web is a 200 grain weight 3/8 inch delustered rayon which is water-laid in an iso orientation before the three-dimensional fabric is made.

Figure 27:
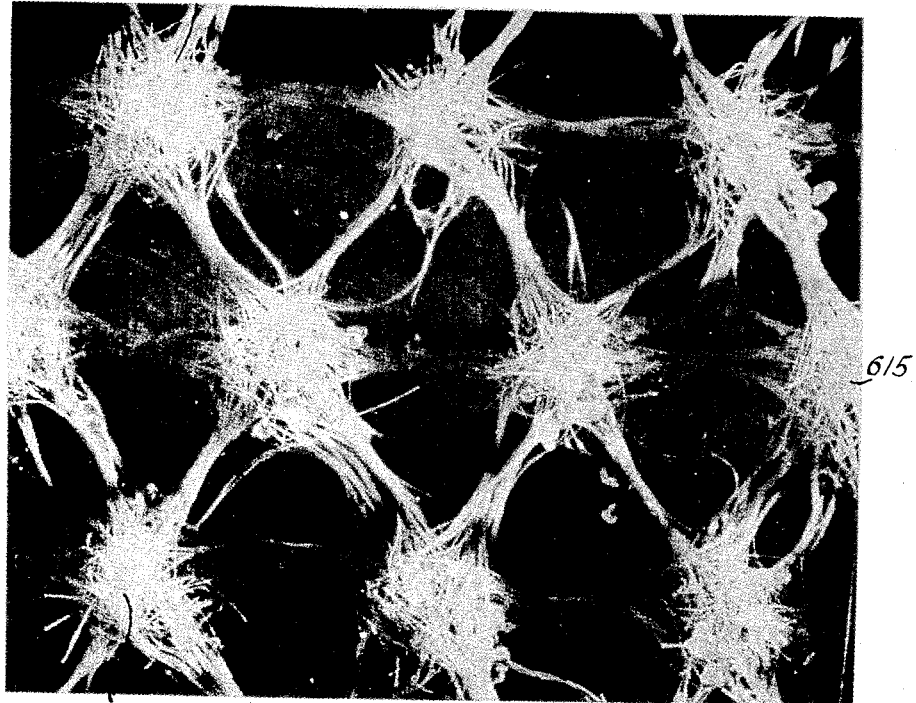
FIG. 27 is a photomicrograph of the fabric shown in FIG. 23 but enlarged about 20 times and in which adhesive particles or flakes have been sprinkled on the tuft areas and in which the particles or flakes of adhesive have been partially fused.

This same fabric produced under slightly different conditions to provide narrower bands may be treated with a powdered adhesive such as nylon powder which is sprinkled onto the back of the rearranging plate after the rearrangement is complete. As is seen in FIG. 27, in the rearranging process the bands between bud areas 615 have been compacted and the bud areas are seen to contain adhering globules of resin. These globules result from the partial fusing of the powder adhered to the bud portions.

In particular, the apparatus which is described and illustrated in FIG. 11 is that capable of producing the fabric shown in FIG. 27.

Figure 26:
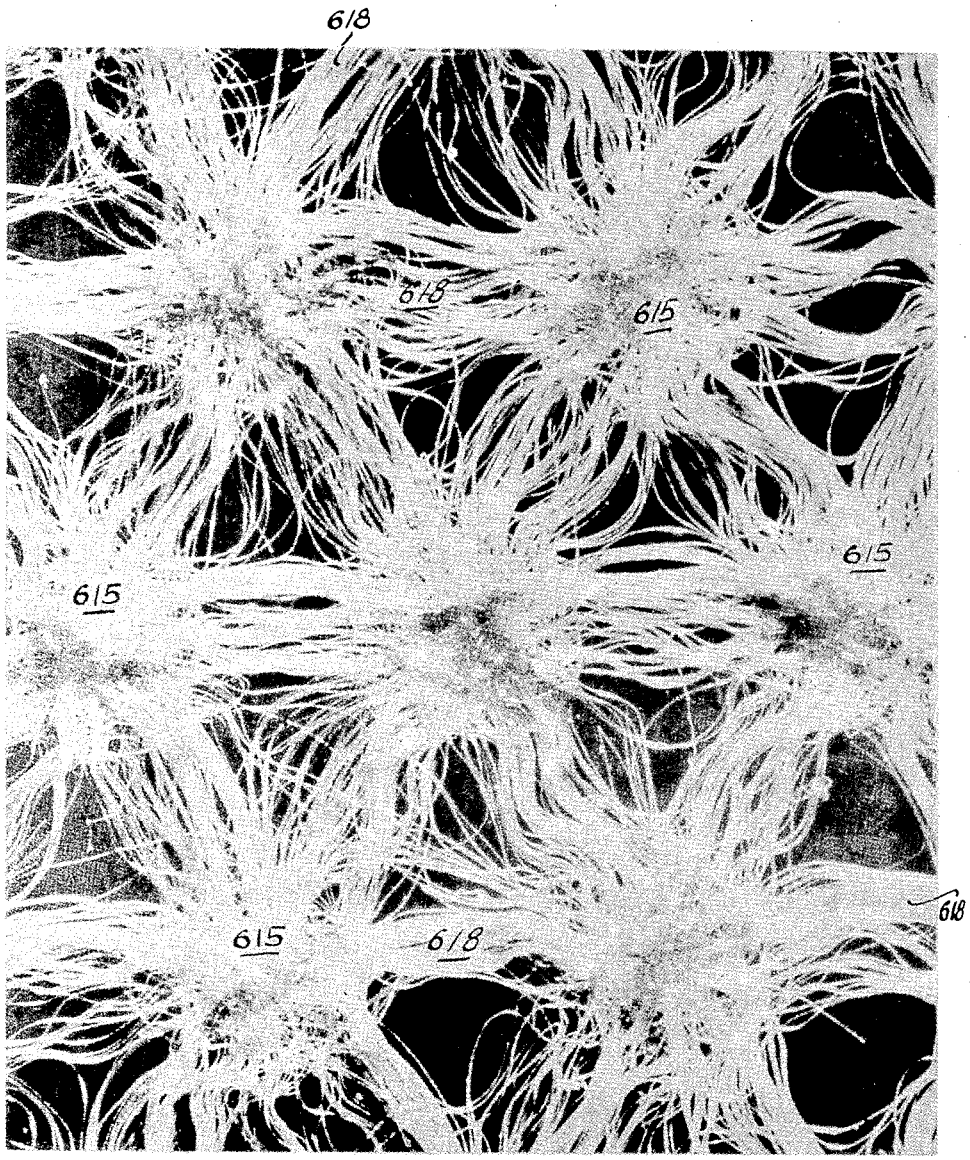
FIG. 26 is a photomicrograph of the fabric shown in FIG. 25 after the rods have been fused by heat and pressing, but enlarged about 30 times.

In FIG. 26, the use of a larger proportion of 1/32 inch 15 denier nylon rods than was employed in FIG. 25 results in the concentration of these rods in the tufted portions 615. In fact, no adhesive rods are located in any of the band areas. The rods have been fused and the fabric has been flattened in a roller. As a result, the bands 618 are spread out and there is a typical fabric-like biasability.

The rods congregate on the tufted fibers of the web during rearrangement of the fibrous layer. The rods may be introduced into the starting web by a number of conventional techniques as are used for depositing or arranging fibers in a web or layer. These techniques include carding, garnetting, air laying, papermaking methods and the like. It is also possible to apply the adhesive rods onto the already prepared layer of starting material as for example, by sprinkling the rods onto a web of fibers as it issues from a web preparation means such as a card, wet formation machine or the like.

Figure 20:
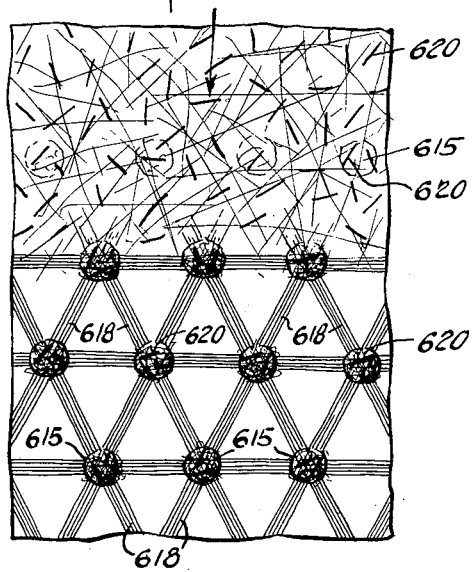
FIG. 20 is a schematic diagram as in FIG. 17 in which "rodding" (bonding) fibers are added.

The adhesive rods may be distributed in the layer during formation in carding, garnetting, and the like, by blending rods with the other fibers such as viscose rayon by conventional textile blending techniques and then carding or garnetting the blended mixture. Likewise, the fibers from such a mixture may be dispersed in an air stream and collected on foraminous means to form a layer by any of a variety of well-known techniques, although shorter rods may be used for this purpose. Rods as short as 1/32 of an inch or shorter may be mixed with other fibers such as viscose rayon fibers in an aqueous slurry and then run over a papermaking screen or wire, in accordance with conventional papermaking techniques, to form a rod-containing three-dimensional fabric as shown in FIG. 20 and FIG. 26 in accordance with this invention.

Rod length may be important both from the standpoint of effective bonding and the ease and flexibility of fabric rearrangement. The lengths of the rods which may be used are, of course, dependent upon the spatial relationship between the tufted portions of the fabric and, if congregation of the rods in these tufted portions is desired during web rearrangement, the rods must be shorter than the spaces between the centers of the tufts.

Figure 15:
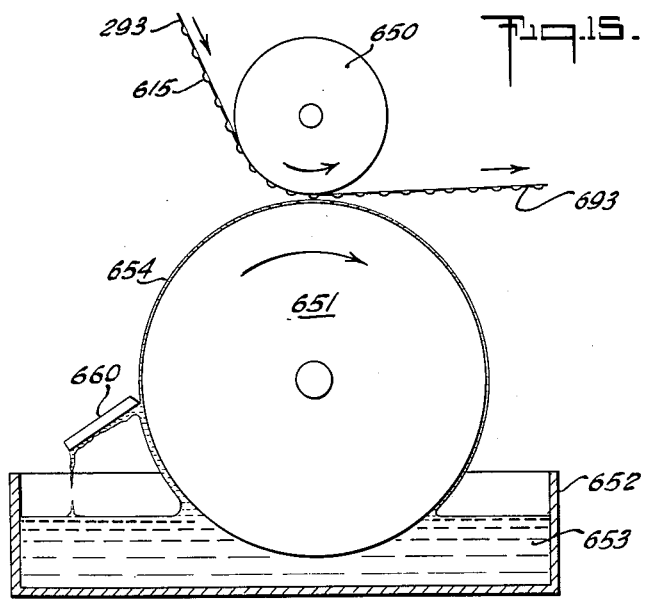
FIG. 15 is an enlarged view of the kissing roll device of FIG. 14.
Figure 16:
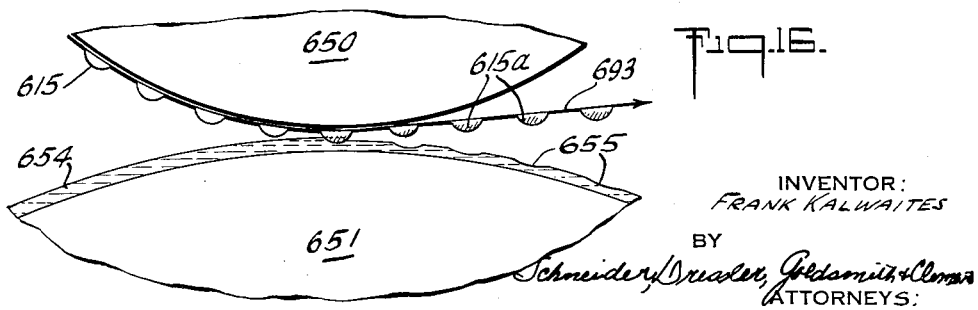
FIG. 16 is a further enlargement of a portion of the device of FIG. 15.

FIGS. 14, 15 and 16 illustrate schematically apparatus for applying adhesive to the protuberances of three-dimensional web by a kissing technique. The web may have been produced by the machine illustrated in FIG. 11 but devoid of the devices 538 and their associated devices for applying the powdered adhesive, or it may have been made on a flexible belt machine described in detail in application Serial No. 567,275, now Patent No. 2,862,251, and which in FIG. 14 is shown as comprising an overlying foraminous belt 236, an underlying apertured belt 237 tracking around and driven respectively by rolls 260 and 249, and a pair of nozzle devices 287b and 287c from which streams of fluid 201 are directed against the "sandwich" presented by the bottom flight of the overlying foraminous belt, the adjacent top flight of the underlying belt, and the intermediate starting material. The budded web 293 thus made is taken into the nip of positioning roller 650 and kissing roller 651 which move in the directions of the arrows as shown in FIGS. 14 and 15. The protuberant bud portions 615 are spaced from the resin adhesive or other adhesive coated surface of the kissing drum 651 at such a distance that only the bud elements are wetted with adhesive while the intervening spaces or bands between the bud elements 615 are kept free of adhesive.

In FIG. 16, the enlarged view shows the action of the buds in lifting out portions of the adhesive film 654 to leave pockets 655 after contact by kissing has been made between the protuberant portions 615 and film 654. The resulting fabric containing adhesive coated protuberant portions 615a may then be dried or it may be further heated if desired to either set the adhesive or to spread the adhesive as may be indicated in view of the particular adhesive employed. For this purpose, rolls 656 and 656' bring the fabric 693 through the appropriate treating zone to deliver the product to a roll 657. Guide rolls 658 are provided to assist in winding the fabric on roll 657.

The kissing roll is immersed in a resin bath 653 in container 652 and provided at one edge with a doctor blade 660 in order to control the depth of the adhesive film thereon as shown in FIGS. 14 and 15.

The rolls 656 and 656' aid in drying of the fabric. They may be internally heated drying drums such as a "Yankee" type or drier drum which is used for drying paper by the paper industry.

The liquid adhesive in bath 653 may be an aqueous dispersion of polyvinyl acetate at a concentration of about 3 to 50 percent, which may be thickened as desired in order to obtain the proper consistency of the film of adhesive 654 as it passes around the kissing roller 651.

The budded protuberances of the three-dimensional fabric point outwardly as they leave the nip between rolls 260 and 249 in FIG. 14. They project sufficiently to contact or "kiss" the adhesive film 654 as shown in detail in FIG. 16.

Depending upon the dimensions of the projections from the base of the three-dimensional fabric, the resin may be thin or thick in order that the appropriate amount of resin be applied to the budded protuberances.

The kissing drum may be operated at any speed desired consistent with the physical properties of the thickened resin film and the properties of the three-dimensional fabric. Where the protuberances are made up of fibers which are strong, relatively speaking, higher speeds may be attained without impairing the structure of the protuberances. Also the thickness of the web is of importance since thinner webs may be easily stretched or torn by the action of the thickened adhesive. The viscosity of the binder is controlled by thickening agents which are well known for polyvinyl acetate suspensions or solutions or the polyvinyl acetate concentration may be adjusted to provide a suitable high viscosity. The clearance between the rolls is aided by the control of the depth of the film, which is adjusted by the knife blade.

The following is an illustrative example of a method for rearranging fabrics which utilizes preferred apparatus in accordance with the invention:

*Example*

In the apparatus illustrated in FIG. 11, a three-dimensional budded fabric is prepared with the aid of vacuum assist means or suction boxes as shown in FIG. 10 at the rearranging zone.

A web 241 of loosely assembled fibers, such as may be obtained by carding, weighing about 300 grains per square yard and with a fiber orientation ratio of approximately 6 to 1 in the direction of travel, is fed into the fabric rearranging apparatus. The web, which may comprise 75 percent viscose rayon fibers approximately 2 inches long and 25 percent bleached cotton fibers averaging about ½ to ¾ of an inch in length, both of approximately 1½ denier, is fed over a positioning roller 48 into the sandwich formed by a foraminous belt screen 37 and an apertured drum 36.

The apertured drum 36 comprises about 250 substantially round holes per square inch of approximately 0.045 inch in diameter arranged in a square pattern, and has a wall approximately 1⁄32 of an inch thick. The foraminous belt 37 comprises a woven stainless steel screen of approximately 200 mesh or substantially 40,000 openings per square inch. Using conventional solid cone nozzles spaced about 4 inches from the belt sandwich and delivering water at about 1.3 gallons per minute, an excellent fabric is produced.

The amount of water may vary from approximately .5 gallon per minute to 2 or more gallons per minute for each nozzle so as to deliver water at a rate varying from about 50 feet per second to 200 feet per second at the delivery end of the nozzle. The grain weights of web may also be varied from 200 grains to 400 grains per square yard. Within these limits excellent three-dimensional budded fabric rearrangement may be obtained.

The individual fibers of the fibrous starting material, being capable of movement under the influence of an applied fluid force, are rearranged by the applied fluid as it flows along the various courses determined by the factors mentioned. The individual fibers may be effectively picked up and swept along, upon, or in the wake of, the various fluid streams passing through the fibrous material and the backing member. A fiber so moved may be transported bodily in a single direction, or part of it may be moved in one direction while other parts or segments are moved in one or more other directions. In any event, the fiber will continue to move under the influence of various fluid streams until its further movement is stopped by the obstruction presented by the land areas of the permeable backing member that surround and define the open passages through the backing member. This is the type of movement involved in production of fabrics such as those shown in FIGS. 21 to 23, for example.

When I use the terms "rearrange" and "rearranged," I mean the rearrangement of the fibers in a preformed web of fibrous material substantially within the plane of the web except for the buds, tufts, and protuberances as described, and with substantial maintenance of the original weight of the web.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

The invention claimed is:

1. A foraminous nonwoven three-dimensional fabric comprising fibers in mechanical engagement one with another and arranged flatwise in bundles interconnected at junctures by protuberant pivotal packings of fibers protruding out of the plane of said flatwise bundles to define a predetermined pattern in which said interconnected bundles and pivotal packings define areas substantially free of fibers.

2. A foraminous nonwoven three-dimensional fabric comprising fibers in mechanical engagement one with another and arranged flatwise in bundles interconnected at junctures by pivotal packings of fibers protruding out of the plane of said flatwise bundles to define a predetermined pattern in which said interconnected bundles and pivotal packings define areas substantially free of fibers, said pivotal packings being concave as viewed on one side and convex as viewed on the opposite side.

3. A foraminous nonwoven three-dimensional fabric comprising fibers in mechanical engagement one with another and arranged flatwise in bundles interconnected at junctures from which said bundles of fibers extend radially, the fibers at each of said junctures forming a pivotal packing of said fibers protruding out of the plane of said flatwise bundles to define a predetermined pattern in which said interconnected bundles and pivotal packings define areas substantially free of fibers, said pivotal packings being concave as viewed on one side and convex as viewed on the opposite side.

4. A foraminous nonwoven three-dimensional fabric comprising a minor proportion of fibers in mechanical engagement one with another and arranged flatwise in bundles and a major proportion of fibers arranged in junctures interconnecting said flatwise bundles and from which the bundles extend radially, the fibers at each of said junctures forming a protuberant pivotal packing of fibers protruding out of the plane of said flatwise bundles to define a predetermined pattern in which said interconnected bundles and pivotal packings define areas substantially free of fibers.

5. A foraminous nonwoven three-dimensional fabric comprising fibers in mechanical engagement one with another and arranged flatwise in bundles interconnected at junctures by protuberant pivotal packings of fibers protruding out of the plane of said flatwise bundles to define a predetermined pattern in which said interconnected bundles and pivotal packings define areas substantially free of fibers, said fabric being bonded locally substantially only in the vicinity of the protuberant pivotal packings of fibers.

6. A foraminous nonwoven three-dimensional fabric comprising fibers in mechanical engagement one with another and arranged flatwise in bundles interconnected at junctures by protuberant pivotal packings of fibers protruding out of the plane of said flatwise bundles to define a predetermined pattern in which said interconnected bundles and pivotal packings define areas substantially free of fibers, and bonding material applied to said fabric locally substantially only in the vicinity of the protuberant pivotal packings of fibers.

7. A foraminous nonwoven three-dimensional fabric comprising fibers in mechanical engagement one with another and arranged flatwise in bundles interconnected at junctures by a protuberant pivotal packing of fibers protruding out of the plane of said flatwise bundles to define a predetermined pattern in which said interconnected bundles and pivotal packings define areas substantially free of fibers, said protuberances including thermoplastic fibers activated to effect a bond.

References Cited in the file of this patent

UNITED STATES PATENTS

| | | |
|---|---|---|
| 1,810,145 | Ross | June 16, 1931 |
| 1,978,620 | Brewster | Oct. 30, 1934 |
| 2,086,592 | Williams | July 13, 1937 |
| 2,213,883 | Lurie | Sept. 3, 1940 |
| 2,281,945 | Milliken | May 5, 1942 |
| 2,308,849 | Young | Jan. 19, 1943 |
| 2,517,529 | Stanley | Aug. 1, 1950 |
| 2,705,688 | Ness et al. | Apr. 5, 1955 |
| 2,733,998 | Russell et al. | Feb. 5, 1956 |
| 2,838,416 | Babiarz et al. | June 10, 1958 |